(12) United States Patent
Hansson et al.

(10) Patent No.: US 10,956,045 B2
(45) Date of Patent: Mar. 23, 2021

(54) APPARATUS AND METHOD FOR ISSUING ACCESS REQUESTS TO A MEMORY CONTROLLER

(71) Applicant: ARM Limited, Cambridge (GB)

(72) Inventors: Andreas Hansson, Cambridge (GB); Ian Rudolf Bratt, Portola Valley, CA (US)

(73) Assignee: ARM Limited, Cambridge (GB)

( * ) Notice: Subject to any disclaimer, the term of this patent is extended or adjusted under 35 U.S.C. 154(b) by 960 days.

(21) Appl. No.: 14/969,414

(22) Filed: Dec. 15, 2015

(65) Prior Publication Data

US 2016/0188209 A1 Jun. 30, 2016

(30) Foreign Application Priority Data

Dec. 31, 2014 (GB) ..................................... 1423397

(51) Int. Cl.
*G06F 3/06* (2006.01)
*G06F 13/16* (2006.01)
*G06F 12/12* (2016.01)

(52) U.S. Cl.
CPC ............. *G06F 3/061* (2013.01); *G06F 3/0629* (2013.01); *G06F 3/0659* (2013.01);
(Continued)

(58) Field of Classification Search
CPC ........ G06F 3/061; G06F 3/0629; G06F 12/12; G06F 13/16; G06F 13/1631; G06F 2212/221; G06F 3/0673
See application file for complete search history.

(56) References Cited

U.S. PATENT DOCUMENTS 6,857,041 B2 * 2/2005 LeClerg .............. G06F 13/1668
711/103
7,376,803 B1 5/2008 Eckert
(Continued)

FOREIGN PATENT DOCUMENTS

WO WO 2011/126625 10/2011
WO WO 2012/175929 12/2012

OTHER PUBLICATIONS

Search Report for GB 1423397.7, dated Jul. 2, 2015, 4 pages.
(Continued)

*Primary Examiner* — Jane Wei
(74) *Attorney, Agent, or Firm* — Nixon & Vanderhye P.C.

(57) ABSTRACT

An apparatus and method are provided for issuing access requests to a memory controller for a memory device whose memory structure consists of a plurality of sub-structures. The apparatus has a request interface for issuing access requests to the memory controller, each access request identifying a memory address. Within the apparatus static abstraction data is stored providing an indication of one or more of the sub-structures of the memory device, and the apparatus also stores an indication of outstanding access requests issued from the request interface. Next access request selection circuitry is then arranged to select from a plurality of candidate access requests a next access request to issue from the request interface. That selection is dependent on sub-structure indication data that is derived from application of an abstraction data function, using the static abstraction data, to the memory addresses of the candidate access requests and the outstanding access requests. Such an approach enables the apparatus to provide a series of access requests to the memory controller with the aim of enabling the memory controller to perform a more optimal access sequence with regard to the memory device.

19 Claims, 11 Drawing Sheets

(52) U.S. Cl.
CPC .......... *G06F 3/0673* (2013.01); *G06F 3/0679* (2013.01); *G06F 13/16* (2013.01); *G06F 13/1631* (2013.01); *G06F 12/12* (2013.01); *G06F 2212/221* (2013.01)

(56) References Cited

U.S. PATENT DOCUMENTS

| | | | |
|---|---|---|---|
| 8,019,950 B1* | 9/2011 | Warshofsky | G06F 13/1678 |
| | | | 710/310 |
| 8,271,743 B2 | 9/2012 | Logan et al. | |
| 2008/0288731 A1 | 11/2008 | Izumi | |
| 2009/0055580 A1* | 2/2009 | Moscibroda | G06F 13/1642 |
| | | | 711/104 |
| 2009/0150624 A1* | 6/2009 | Resnick | G06F 9/3004 |
| | | | 711/155 |

OTHER PUBLICATIONS

Shao et al., "A Burst Scheduling Access Reordering Mechanism", IEEE 13th International Symposium on High Performance Computer Architecture, Feb. 2007, IEEE, 10 pages.

Zhao et al., "GEMI: A High Performance and High Flexibility Memory Interface Architecture for Complex Embedded SOC", International Conference on Computer Science and Software Engineering, Dec. 2008, IEEE, 4 pages.

Jeon, "Reducing DRAM Row Activations with Eager Writeback", RICE University, Dec. 2013, 76 pages.

Stuecheli, et al., "The Virtual Write Queue: Coordinating DRAM and Last-Level Cache Policies", ISCA '10, Jun. 19-23, 2010, pp. 72-82 (11 pages).

* cited by examiner

```
         31 30 29 28 27 26 25 24 23 22 21 20 19 18 17 16 15 14 13 12 11 10 9 8 7 6 5 4 3 2 1 0
                     ROW                     :RANK: BANK : COLUMN HIGH     :C:    :BURST
305                                                                        CHANNEL  COL
                                                                                    LOW 302      1  1  1  1  1  1  1  1  1  1  1  1  0  0 ─────────────────────────── 0 0

= 0xfff00000

310      0  0 ─────────────────────────── 0  0  1  1  1  1  1  0 :0: 1 0 0 0 0 0 0

= 0x000f8040
```

LOCALITY MASK — 302

PARALLELISM MASK — 310

OT_ADDR = ADDRESS OF OUTSTANDING ACCESS REQ, CAND_ADDR = ADDRESS OF CANDIDATE ACCESS REQ

LOCALITY HIT =  [(OT_ADDR) AND ((LOCALITY MASK) OR (PARALLELISM MASK))] = [(CAND_ADDR) AND ((LOCALITY MASK) OR (PARALLELISM MASK))]

LOCALITY CONFLICT =  [(OT_ADDR) AND (PARALLELISM MASK)] = [(CAND_ADDR) AND (PARALLELISM MASK)]
AND
[(OT_ADDR) AND (LOCALITY MASK)] ≠ [(CAND_ADDR) AND (LOCALITY MASK)]

APPARATUS AND METHOD FOR ISSUING ACCESS REQUESTS TO A MEMORY CONTROLLER

This application and claims priority to GB Patent Application No. 1423397.7 filed 31 Dec. 2014, the entire content of which is hereby incorporated by reference.

BACKGROUND

The present technique relates to an apparatus and method for issuing access requests to a memory controller.

Many memory devices are arranged to consist of a plurality of sub-structures, and the manner in which individual accesses to the memory device are performed with respect to those sub-structures can give rise to non-uniform access timing characteristics. The memory controller associated with the memory device will decode the memory address provided by an access request in order to identify the particular sub-structures that need to be accessed in order to process the access request. Often the sub-structures are hierarchical. For example, considering a DRAM memory device, this is often organised in ranks, banks, rows and columns, and indeed at a higher hierarchical level there may be multiple channels. Whilst certain sub-structures such as ranks and banks can be accessed in parallel, there can be restrictions on how other sub-structures (for example rows) are accessed. Again considering the particular example of DRAM, within a particular bank it is the case that only a single row can be accessed at a time, and it takes time to prepare the row for access.

Accordingly, the memory controller for the memory device can seek to rearrange the order in which pending access requests are performed so as to take account of such constraints in order to improve the overall memory performance. For example, whilst a particular row within a bank has been activated for access, it is generally beneficial to perform any pending accesses to that row before performing any accesses that require a different row within the same bank to be accessed.

However, to enable such beneficial reordering to be performed, the memory controller needs to have detailed information about the structure of the memory device, and retain dynamic state information about the current state of the memory device, for example which sub-structures such as rows are currently activated. Further, it can only perform such reordering with regard to the pending access requests held in its pending access requests buffers, and by their nature such buffers will be of a finite size.

Elsewhere in the system there will be requesting agents that are responsible for issuing access requests to the memory controller for adding into the memory controller's pending access requests buffer(s). Where such a requesting agent has choice as to the order in which access requests are issued from it to the memory controller, it would be useful if those elements could make their selection of access requests in a manner that would assist the memory controller in improving the performance of the memory device, by populating the pending access requests buffer(s) of the memory controller with access requests that can be processed efficiently having regards to the non-uniform access timing characteristics of the memory device.

However, previous work in this area has involved closely coupling the requesting agent with the memory controller so that detailed information about the memory structure and the dynamic state of the memory device can be shared between the memory controller and the closely coupled requesting agent. This can be useful where the requesting agent can practically be tightly coupled with the memory controller, such as is sometimes the case with a final level, system, cache. However, such an approach is difficult and costly to implement, and is restricted to requesting agents that can be tightly with the memory controller.

It would be desirable to provide a mechanism that could be employed by a requesting agent to issue access requests in a way that may assist the memory controller's aim of improving the efficiency of performing memory accesses, but without the need for the requesting agent to be closely coupled with the memory controller.

SUMMARY

In one example arrangement there is provided an apparatus, comprising: a request interface to issue access requests to a memory controller for a memory device whose memory structure consists of a plurality of sub-structures, each access request identifying a memory address; an abstraction data storage to store static abstraction data providing an indication of one or more of the sub-structures; an outstanding access requests storage to store an indication of outstanding access requests issued from the request interface; and next access request selection circuitry to select from a plurality of candidate access requests a next access request for issuance from the request interface, said selection being dependent on sub-structure indication data derived from application of an abstraction data function, using said static abstraction data, to the memory addresses of the candidate access requests and the outstanding access requests.

In another example arrangement, there is provided a method of issuing access requests to a memory controller for a memory device whose memory structure consists of a plurality of sub-structures, each access request identifying a memory address, the method comprising: storing static abstraction data providing an indication of one or more of the sub-structures; storing an indication of outstanding access requests issued from a request interface; and selecting from a plurality of candidate access requests a next access request for issuance from the request interface, said selection being dependent on sub-structure indication data derived from application of an abstraction data function, using said static abstraction data, to the memory addresses of the candidate access requests and the outstanding access requests.

In a third example arrangement, there is provided an apparatus, comprising: request interface means for issuing access requests to a memory controller for a memory device whose memory structure consists of a plurality of sub-structures, each access request identifying a memory address; abstraction data storage means for storing static abstraction data providing an indication of one or more of the sub-structures; outstanding access requests storage means for storing an indication of outstanding access requests issued from the request interface means; and next access request selection means for selecting from a plurality of candidate access requests a next access request for issuance from the request interface means, said selection being dependent on sub-structure indication data derived from application of an abstraction data function, using said static abstraction data, to the memory addresses of the candidate access requests and the outstanding access requests.

BRIEF DESCRIPTION OF THE DRAWINGS

The present technique will be described further, by way of example only, with reference to embodiments thereof as illustrated in the accompanying drawings, in which:

FIG. 6 schematically illustrates a locality mask and parallelism mask that may be used as the abstraction data in accordance with one embodiment;

DESCRIPTION OF EMBODIMENTS

Figure 1:
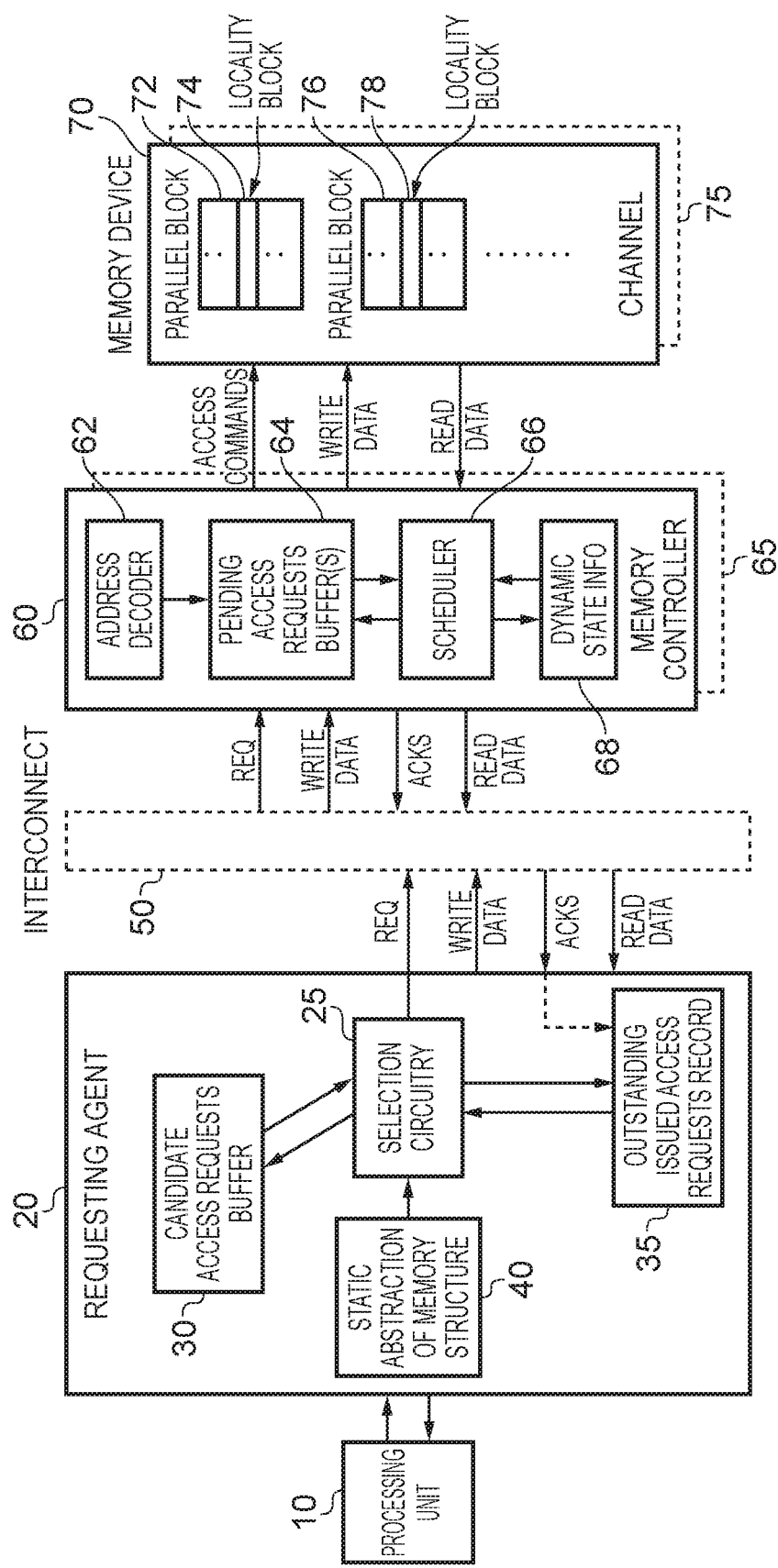
FIG. 1 is a block diagram of a data processing system in accordance with one embodiment.

Before discussing the embodiments with reference to the accompanying figures, the following description of embodiments is provided.

In accordance with one example embodiment, an apparatus is provided for issuing access requests to a memory controller, where the memory controller is used to control a memory device whose memory structure consists of a plurality of sub-structures. The apparatus is arranged to store static abstraction data providing an indication of one or more of the sub-structures. The apparatus also keeps track of outstanding access requests that it has issued to the memory controller. When deciding on a next access request to issue to the memory controller to be selected from a plurality of candidate access requests, selection circuitry within the apparatus makes that selection dependent on sub-structure indication data which is derived from application of an abstraction data function, using the static abstraction data, to the memory addresses of both the candidate access requests and the outstanding access requests.

In one embodiment, the static abstraction data is not altered during run time of the memory controller, but instead provides static information about salient aspects of the sub-structures. As such, the static abstraction data does not encode any dynamic information about the state of the memory device whilst in use, such as which sub-structures are currently being accessed by the memory controller, current power states of the memory device, etc. As a result, the static abstraction data can readily be provided to the apparatus, even where the apparatus is not closely coupled with the memory controller. For example, in one embodiment, the static abstraction data is generated at initialisation time of the memory controller, and then stored in an abstraction data storage within the apparatus.

In one embodiment, the static abstraction data does not provide detailed structural information about the organisation of the memory structure of the memory device, but merely provides a level of abstraction in relation to the sub-structures sufficient to allow sub-structure indication data to be derived by the apparatus that is useful in guiding the selection of the next access request by the apparatus. For example, in one embodiment the static abstraction data is sufficient to allow sub-structure indication data to be derived for each candidate access request that gives an indication of correspondence between a sub-structure to be accessed to process that candidate access request and a sub-structure to be accessed to process one or more of the outstanding access requests.

There are a number of ways in which the sub-structure indication data can be derived for each candidate access request. In one embodiment, the apparatus further comprises comparison data generation circuitry to produce comparison data for a memory address by applying the abstraction data function to the memory address, and sub-structure indication data generation circuitry to generate the sub-structure indication data for each candidate access request by comparing the comparison data produced for the memory address of that candidate access request with the comparison data produced for the memory address of at least a subset of said outstanding access requests. Hence, in one embodiment a logical operation is performed using the static abstraction data and a memory address as input in order to generate comparison data that will be dependent on the memory address. Such comparison data can be generated not only for the memory address of a candidate access request, but also for the memory addresses of any outstanding access requests. The comparison data can then be compared in order to produce sub-structure indication data for the candidate access request.

The abstraction data function may depend on the form of the static abstraction data, but in one embodiment the combination of the static abstraction data and the abstraction data function enable a static address decoding function to be performed in respect of a memory address, and in particular will result in the generation of comparison data that is dependent on the sub-structures that will need to be accessed in order to process an access to that memory address.

Whilst in one embodiment the sub-structure indication data for a candidate access request can be produced by comparing the comparison data produced for that candidate access request with the comparison data produced for a certain subset of the outstanding access requests, in one embodiment the comparison is performed in relation to all of the outstanding access requests indicated in the outstanding access requests storage of the apparatus (i.e. in relation to all access requests that have been issued by the apparatus to the memory controller and which are still understood by the apparatus to be outstanding). As the apparatus becomes aware that certain outstanding access requests have been processed in the memory device, for example due to certain acknowledgement signals received from the memory controller, the elapse of certain timers, etc, the details of those outstanding access requests can be removed from the outstanding access requests storage.

The plurality of sub-structures can take a variety of forms but in one embodiment comprise a plurality of parallel sub-structures that are accessible in parallel, each parallel sub-structure comprising a plurality of locality sub-structures, for each parallel sub-structure only one locality sub-structure being accessible at a time.

In such embodiments, the static abstraction data may provide an encoding of the parallel sub-structures and the locality sub-structures. In particular, in one embodiment, the encoding provides sufficient information to enable a determination to be made as to whether a pair of memory addresses will require access to the same locality substructure within the same parallel sub-structure.

The static abstraction data can be represented in a variety of ways, and will typically be dependent on the manner in which memory addresses map to physical sub-structures within the memory device. However, in one embodiment the static abstraction data comprises a parallelism mask and a locality mask. In one such embodiment, for a chosen memory address, the application of the abstraction data function comprises applying the parallelism mask to the chosen memory address to produce first comparison data indicative of a parallel sub-structure associated with the chosen memory address, and applying the locality mask to the chosen memory address to produce second comparison data indicative of a locality sub-structure associated with the chosen memory address.

The sub-structure indication data that is derived from the application of the abstraction data function to the various memory addresses can take a variety of forms, but in one embodiment the sub-structure indication data provides locality indication data for each candidate access request with respect to the outstanding access requests.

The locality indication data can take a variety of forms. In one embodiment, the locality indication data provides a locality hit indication for a candidate access request if the first and second comparison data produced for the memory address of the candidate access request matches the first and second comparison data produced for the memory address of an outstanding access request. If both the first and second comparison data match, this means that the same locality sub-structure within the same parallel sub-structure will be accessed for both the candidate access request and the outstanding access request under consideration.

In addition, or alternatively, the locality indication data may provide a locality conflict indication for a candidate access request if the first comparison data produced for the memory address of the candidate access request matches the first comparison data produced for the memory address of an outstanding access request, but the second comparison data produced for the memory address of the candidate access request does not match the second comparison data produced for the memory address of that outstanding access request. In particular, if the first comparison data matches but the second data comparison does not, this means that the candidate access request is seeking to access a different locality sub-structure to that being accessed by the outstanding access request under consideration, but that both of those locality sub-structures reside within the same parallel sub-structure. Since only one locality sub-structure within each parallel sub-structure is accessible at a time, the candidate access request in that situation is not a good candidate for improving the efficiency of operation of the memory device, since the memory controller could not reschedule those two access requests with respect to each other so as to improve the performance of the memory accesses required.

In one embodiment, the next access request selection circuitry is arranged to select the next access request for issuance from the request interface with reference to the locality hit indications and locality conflict indications produced for each of the plurality of candidate access requests.

The selection criteria used by the next access request selection circuitry can take a variety of forms. However, in one embodiment the next access request selection circuitry is arranged to select access requests for issuance from the request interface so as to give preference to access requests having locality hit indications. Alternatively, or in addition, the next access request selection circuitry may be arranged to select access requests for issuance from the request interface so as to give preference to access requests that do not have locality conflict indications.

By such an approach, the apparatus can seek to issue access requests to the memory controller in an order that improves the prospect of allowing the memory controller to efficiently access the memory device having regard to earlier access requests that the apparatus has issued. In particular, whilst the apparatus will not have a full complete picture of the access requests currently pending in the memory controller (since typically there will be other devices in the system other than the apparatus in question which can also issue access requests to the memory controller), and although the apparatus has no knowledge of the current state of the memory device, it does have an understanding of the access requests that it has previously issued and which it understands to still be outstanding, and using the static abstraction data provided can seek to bias its selection of subsequent access requests so as to choose those that have the best locality correlation with such access requests already issued and still pending.

In one embodiment, the outstanding access requests storage is responsive to acknowledgement data from the memory controller to remove from the indication of outstanding access requests any access request that is no longer outstanding. Whilst for certain types of access the acknowledgement data from the memory controller may directly confirm that the access has actually been performed, for other types of access the acknowledgment data may merely identify that the memory controller has received the particular access request, but not that the access request has actually been performed within the memory device. For example, in one embodiment, an acknowledgement for a read request will typically indicate that the data has been read from memory. However, an acknowledgement for a write request may merely identify that the write request has been accepted for processing by the memory controller, but will not necessarily confirm that the write has actually been performed within the memory device. Hence, for such a write access request, it may be appropriate for the apparatus to still consider that write access request as being outstanding even after the acknowledgement has been received from the memory controller. In one such embodiment, for such a type of access request the outstanding access request storage is arranged to instead apply predetermined criteria (such as the elapsing of a particular timer) to determine when an outstanding access request is no longer to be considered outstanding, and then to remove from the indication of outstanding access requests any access request that is no longer considered outstanding. Hence, in one example, the apparatus may assume a certain latency with respect to performance of a write operation after the acknowledgement is received from the memory controller, and encode that latency within a timer, so that the particular access request in question is only considered no longer to be outstanding once that timer has elapsed.

There are a number of ways in which the apparatus may be coupled to the memory controller. In one embodiment, the request interface of the apparatus is coupled to the memory controller via an interconnect structure employing an interconnect protocol. In such a configuration, it is typically not possible for the apparatus to be closely coupled with the memory controller. In addition, it may not be possible having regard to the interconnect protocol to provide dynamic state information about the state of the memory device, and even where it were possible to transmit such information to the apparatus the latency in doing so may mean that that information would be out of date by the time it was available to the apparatus. The techniques of the above described embodiments are particularly useful in such an arrangement, since the apparatus does not rely on such detailed dynamic information, but instead can select the access request to issue next based purely on static abstraction data relating to the memory device that, as mentioned earlier, may be obtained once (for example at initialisation time of the memory controller), and thereafter remains unchanged during run time of the memory controller.

The apparatus can take a variety of forms. For example in one embodiment, the apparatus may be a cache provided within a data processing system. The above described techniques can then be employed whenever the cache has to select a victim cache line to evict from the cache back to memory. Hence, on occurrence of a cache miss, the above described techniques can be employed to determine which of various possible candidate cache lines to evict, based on the consideration of the memory address associated with the data in those cache lines. The mechanism would not be restricted to use in association with cache misses, but in addition could also be used for certain types of cache hit. For example, if a cache hit occurs with respect to a dirty cache line, then the memory address of the data in that cache line could also be considered as forming a candidate access request, since if there was determined to be a certain level of locality hits with regard to that potential candidate access request and the outstanding access requests, it could be decided to perform an early write back of the dirty cache line, with the aim of providing the memory controller with a series of access requests that can be processed efficiently within the memory device.

In another embodiment, the apparatus need not be a cache, but could take the form of a different requesting agent used to issue access requests to the memory controller. For example, in one embodiment the apparatus may comprise an on-chip memory interface of an integrated circuit, with the memory controller then being provided off-chip. Such an arrangement would for example exist in emerging abstracted memory interfaces such as the Hybrid Memory Cube (HMC), where the traditional memory controller functionality is split into a more abstract on-chip controller (which could take the form of the above described apparatus), and an off-chip media controller (the memory controller with which the above described apparatus communicates) that is closely coupled to the actual memory device. Through use of the above described techniques, the controller on-chip could assist the efficiency achievable by the off-chip memory controller in the memory cube by sending a more optimal access stream, without the on-chip controller needing detailed information about the actual memory device and/or its current state.

Particular embodiments will now be described with reference to the figures.

FIG. 1 is a block diagram of a data processing system in accordance with one embodiment. As shown, a processing unit 10 communicates a with a requesting agent 20 that is responsive to the activities of the processing unit to issue access requests in respect of data held in a memory device 70. The memory device 70 has a memory controller 60 associated therewith that is arranged to receive the requests from the requesting agent 20 (along with any other access requests issued by other requesting agents within the system), and to then schedule those access requests for processing within the memory device. There are a number of ways in which the requesting agent 20 may be coupled with the memory controller 60, but in the arrangement shown in FIG. 1 it is assumed that there is an intervening interconnect structure 50 via which the requesting agent 20, and typically a number of other entities, communicate with the memory controller 60.

The memory device 70 is arranged as a plurality of blocks (also referred to herein as sub-structures), and in particular consists of a plurality of parallel blocks 72, 76, which are accessible in parallel, and a plurality of locality blocks 74, 78 within each parallel block. In one embodiment, within any particular parallel block only one locality block can be accessed at a time. Typically there will be a time overhead associated with preparing a locality block for access, and with then closing that locality block after it has been accessed prior to preparing another locality block within a parallel block for access. Accordingly, the time taken to process any particular access request will depend on where the memory address of that access request maps to within the memory device structure, and in particular it will be significantly quicker to process an access request whose memory address maps to a portion of a locality block that is already available for access, for example due to a preceding access request also targeting a location within that locality block.

As a result of such a memory structure, it will be appreciated that the memory device exhibits non-uniform access timing for access requests, and significant performance improvements can be achieved by the memory controller arranging the pending access requests optimally having regards to the structure of the memory device and the current state of the various blocks within the memory device.

In particular, as each access request is received by the memory controller 60, the address decoder 62 translates the memory address specified in the access request into a particular parallel block and locality block within the memory device and then adds the decoded access request to the pending access requests buffer 64. In practice there may be multiple buffers, for example there may be a buffer for read accesses and a different buffer for write accesses. The memory controller 60 also maintains dynamic state information 68 about the memory device, and in particular keeps a record of which locality blocks are currently active within each parallel block, along with potentially other information such as the power state of the various blocks. Based on this information and the identification of the pending access requests in the buffers 64, the scheduler 66 then seeks to schedule the various pending access requests so as to optimise the performance of the memory device. In particular, it will seek to order the various pending access requests so that multiple pending access requests targeting the same locality block are processed whilst that locality block is activated for access, so as to reduce the number of times that individual locality blocks need to be activated and deactivated. It will then issue appropriate access commands to the memory device in order to perform the required access operations, so as to cause the write data of pending write access requests to be written into the memory device, and the read data required by pending read access requests to be returned from the memory device. Whilst not explicitly shown in FIG. 1, the memory controller 60 will typically have a buffer for storing the write data of the pending write access requests, and may also potentially buffer read data prior to that read data being returned via the interconnect 50 and the requesting agent 20 to the relevant processing unit 10.

Whilst in one embodiment a single memory controller 60 may control the entire memory device, in some embodiments the memory device is partitioned into multiple parts, with each part having an associated separate memory controller. Considering the example of Dynamic Random Access Memory (DRAM), the memory device may be partitioned into multiple channels 70, 75 with each channel having a separate memory controller 60, 65. The other memory controller 65 will be constructed in a similar fashion, and function in a similar way, to that described in relation to the memory controller 60.

From the above discussion of the memory controller, it will be appreciated that the memory controller will typically be seeking to optimise the accesses having regards to locality, in order to seek to reduce the time overhead associated with activating and deactivating particular locality blocks within the memory device. Typically if the scheduler 66 cannot identify suitable pending access requests within the buffer to enable such optimisation to take place, the controller will seek to achieve high parallelism, by targeting different parallel blocks. As will be apparent from the above discussions, these decisions are usually based on a review of detailed information about the current state of the memory device and the transactions currently residing in the memory controller's queues. Such a review is possible due to the close coupling of the memory device 70 and its associated memory controller 60.

Typically, known requesting agents within the system would leave all such scheduling to the memory controller. However, due to the finite size of the pending access requests buffers within the memory controller, this effectively limits the number of pending access requests that the memory controller can view and thus consider for scheduling.

In one embodiment, the requesting agent 20 aims to assist the above described operation of the memory controller by carefully selecting the order in which access requests are forwarded to the memory controller so as to increase the likelihood that the pending access requests buffers in the memory controller will contain suitable access requests to seek to improve the performance benefits that be achieved by the scheduler 66. However, it is often not practical for the requesting agent to have detailed structural information about the memory device, and it is also impractical for the requesting agent to be kept appraised of the dynamic state information that is available to the scheduler. For example, in FIG. 1 the presence of the interconnect 50 prevents the requesting agent 20 from being closely coupled with the memory controller 60, and indeed the interconnect protocol used by the interconnect may not facilitate the provision of detailed dynamic state information about the memory device to the requesting agent 20. In addition, even if such transmission of information could be facilitated, the transmission delays involved may result in such dynamic state information being out of date by the time it is available to the requesting agent 20.

In accordance with the embodiment illustrated in FIG. 1, the requesting agent keeps a record of outstanding issued access requests in the storage 35. In one embodiment, this is part of the standard functionality of the requesting agent, so that it can keep track of the access request that it has issued, and in particular identify when those requests have been processed. As shown in FIG. 1, the memory controller will typically send acknowledgement signals back to the requesting agent, and these can be used to determine when particular access requests in the outstanding issued access requests record 35 are no longer outstanding. For read access requests, it is typically the case that the acknowledgement will be provided once the read data has been obtained from memory, and accordingly the acknowledgment for a read access request does identify that the memory device has processed the read access request. However, in some embodiments the memory controller may issue an early acknowledgement for a write access request, this acknowledging that the memory controller has accepted the write access request for processing, but not necessarily indicating that the write access has actually been performed in the memory device. In such embodiments, the requesting agent may maintain supplemental information, such as timers, in order to enable it to make a judgement as to when an outstanding issued write access request is no longer outstanding. As an example, it may merely maintain some generic latency information for the time delay expected between receipt of a write acknowledgement signal, and the write request actually being processed in the memory device, and use that information to determine when to actually remove an indication of an outstanding issued write access request from the record 35.

The requesting agent 20 will also maintain information about candidate access requests (for example in a buffer 30) from which it can select the next access request for issuing via the interconnect 50 to the memory controller 60.

In accordance with the embodiment described in FIG. 1, the requesting agent also maintains a static abstraction of the memory structure within the storage 40, which is accessible to selection circuitry 25 when deciding which of the candidate access requests to issue as the next access request to the memory controller 60. In one embodiment, the static abstraction of the memory structure does not seek to provide a very detailed structural description of the memory device, but provides some basic information about parallelism and locality within the memory device that be used by the selection circuitry when analysing the candidate access requests with regards to the outstanding issued access requests. Such static abstraction data can be obtained once, for example at initialisation time of the memory controller, and thereafter does not need updating. In particular, it does not provide any information about the dynamic state of the memory device or what access requests are actually being processed at any particular point in time by the memory device under control of the memory controller. Accordingly, such static abstraction data can be readily provided to the requesting agent irrespective of its location within the data processing system, and there is no requirement for the requesting agent 20 to be closely coupled with the memory controller 60.

As a result, the above described technique can be employed in a wide variety of requesting agents within a data processing system. As one example, the requesting agent 20 may be a cache structure within the data processing system, and indeed may be a cache structure at any desired level in a cache hierarchy. For example, the requesting agent 20 does not need to be the lowest level of the cache hierarchy closest to the memory controller, but may be a cache more closely coupled with the processing unit 10. The processing unit 10 can take a variety of forms, and hence for example may be a central processing unit (CPU), a graphics processing unit (GPU), a direct memory access engine, etc. The requesting agent also need not be a cache. Instead, by way of example, for emerging abstracted memory interfaces such as Hybrid Memory Cube (HMC), the memory controller functionality is split into a more abstract on-chip controller (which could employ the requesting agent functionality of the above described embodiment), and an off-chip media controller close to the actual memory, which would be analogous to the memory controller shown in FIG. 1. In such an arrangement, the requesting agent in the form of the on-chip memory controller could assist the operation of the off-chip memory controller in the memory cube by sending a more optimal access stream based on the selection circuitry's reference to the static abstraction of the memory structure 40.

Figure 2A:
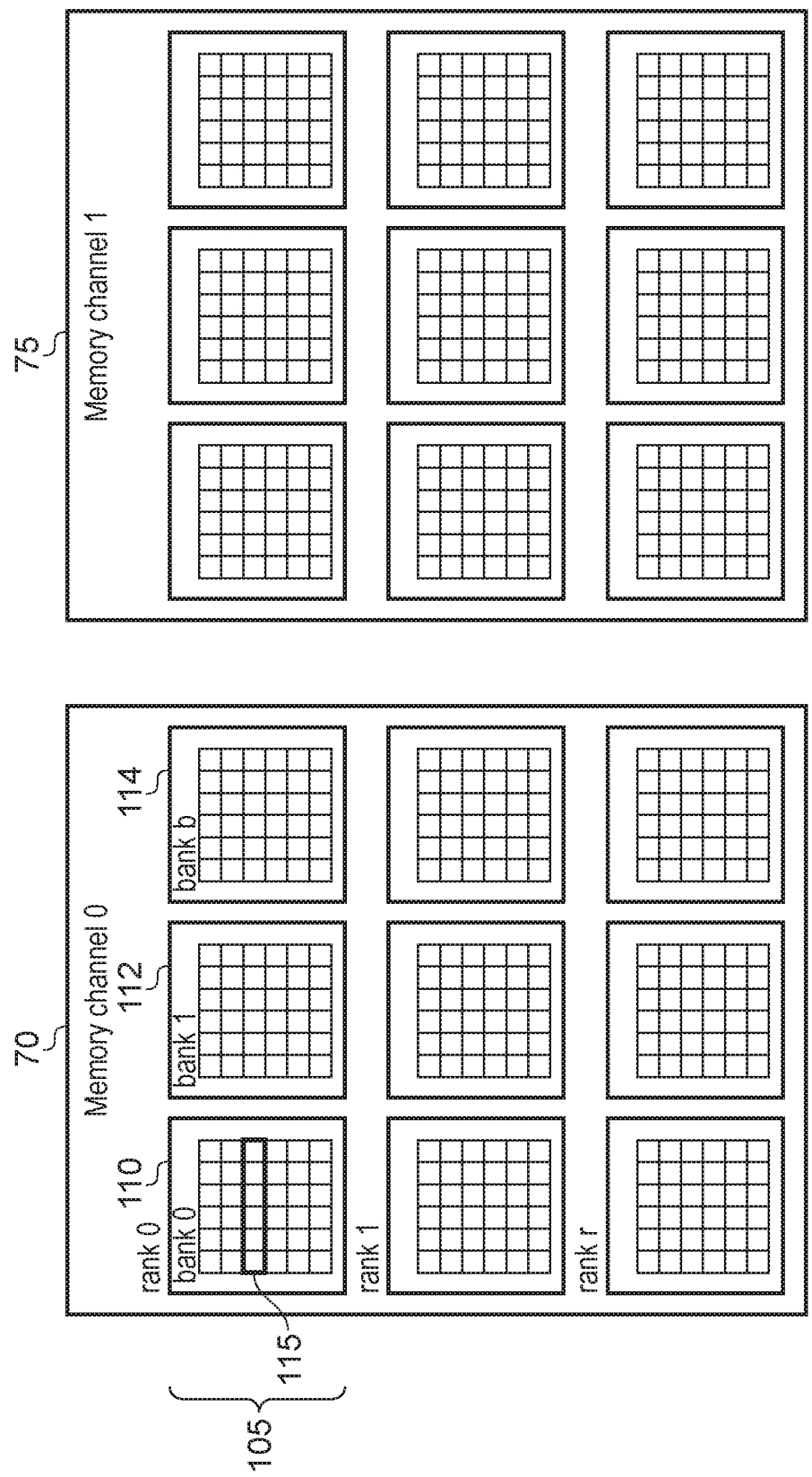
FIGS. 2A and 2B illustrate the arrangement of a memory device that may be used within the system of FIG. 1 in accordance with one embodiment.

More details of the operation of the requesting agent 20, and how the static abstraction of the memory structure 40 is used, will be provided later, but firstly a particular example of the memory device 70 will be discussed with reference to FIGS. 2A and 2B. FIG. 2A illustrates a particular example of a DRAM memory, a DRAM being typically organised into channels, ranks, banks, rows and columns, with the performance of the memory device greatly depending on the access patterns (i.e. how the scheduler schedules the various pending access requests) and the address mapping (i.e. how the specified memory addresses are decoded into physical locations within the memory device). In the example of FIG. 2A, the DRAM memory is considered to consist of two memory channels 70, 75, with each memory channel having a plurality of ranks 105, and with each rank consisting of a plurality of banks 110, 112, 114. The memory channels, ranks and banks are all examples of parallel blocks, with the finest granularity of parallel block being the banks. Within each bank, the memory is organised into rows, one such row being indicated by the box 115, each row having multiple columns. When accessing a specific column, the memory controller first has to prepare the row within the relevant bank, perform a read or write operation to the appropriate column, and then close the row. Due to the time taken to prepare the row and subsequently close the row, it is highly beneficial if multiple read/write operations are performed within the row whilst it is open. Rows in different banks can be accessed in parallel.

In the above example, the row 115 is an example of the locality block 74, 78 shown in FIG. 1. The memory controller will typically be optimised for locality, in this case seeking to increase the number of column accesses within a particular row of a particular bank. If there are no such accesses, the controller will aim to achieve high parallelism, by targeting different banks, avoiding rows in the same rank/bank causing conflicts. Such decisions can be taken by the scheduler within the memory controller 60, due to its close coupling with the memory device, and in particular its detailed knowledge of the structural arrangement of the memory device, and of the dynamic state of the memory device (e.g. which rows are currently open, etc). However, the extent to which the memory controller can optimise the accesses is limited by the number of pending accesses within the buffers 64, and by necessity the buffers will have a finite size.

From the above discussions, it will be appreciated that a DRAM memory has a non-uniform access timing requirement, which means that once a row has been activated for access, it is beneficial to perform further pending access requests to that row before that row is deactivated, and another row then activated for access. FIG. 2B is a diagram illustrating access circuitry provided in association with each bank within one of the ranks of the DRAM memory shown in FIG. 2A, in accordance with one embodiment. In particular, FIG. 2B illustrates the example of the rank 105. In it envisaged that each rank will be constructed similarly to that shown in FIG. 2B.

Figure 2B:
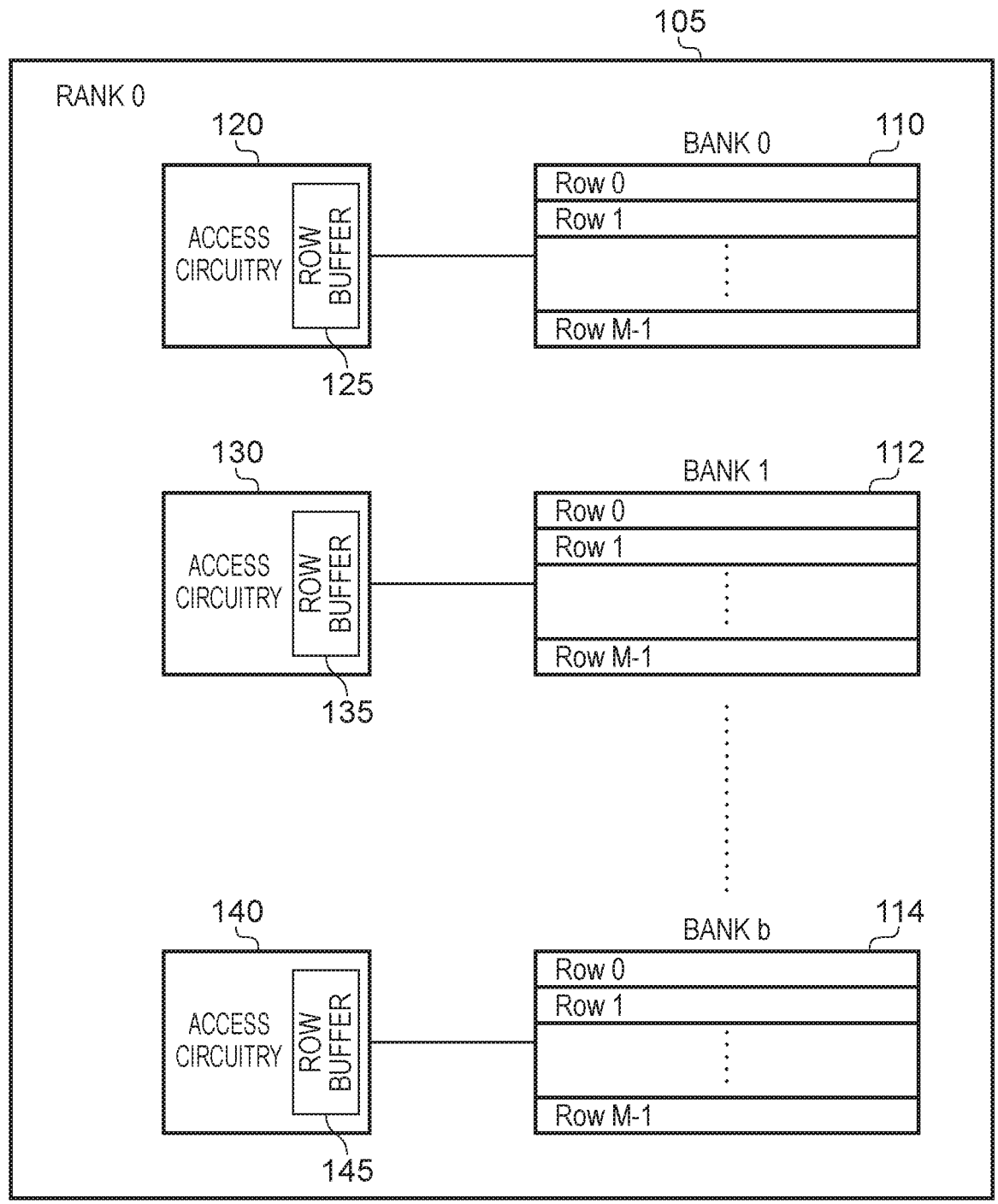

As shown in FIG. 2B, for each bank 110, 112, 114, there is associated access circuitry 120, 130, 140 which is responsive to scheduling control commands from the scheduler 66 of the memory controller 60. Each access circuitry 120, 130, 140 includes a row buffer 125, 135, 145, respectively, for storing at least one row of data from the associated bank. In order to access a data value in a row, that row first has to be moved into the relevant row buffer via a RAS command issued from the memory controller, such a RAS command also being referred to herein as an activate command. Once the row has been stored in the row buffer, then individual memory addresses within that row can be accessed via CAS commands issued from the memory controller. Ultimately, when accesses to the row have been completed, or when a new row needs to be accessed, a precharge command is issued from the memory controller to cause the current contents of the row within the row buffer to be stored back into the associated bank within the DRAM.

It will hence be appreciated that there is a significant access time penalty, and indeed a power consumption penalty, incurred when activating a row so that its contents can subsequently be accessed, and accordingly it is beneficial, once a row has been activated and accordingly its contents have been stored within the row buffer, for a plurality of accesses to the memory addresses of that row to then be performed before the row's contents are then subsequently returned to the bank.

Figure 3:
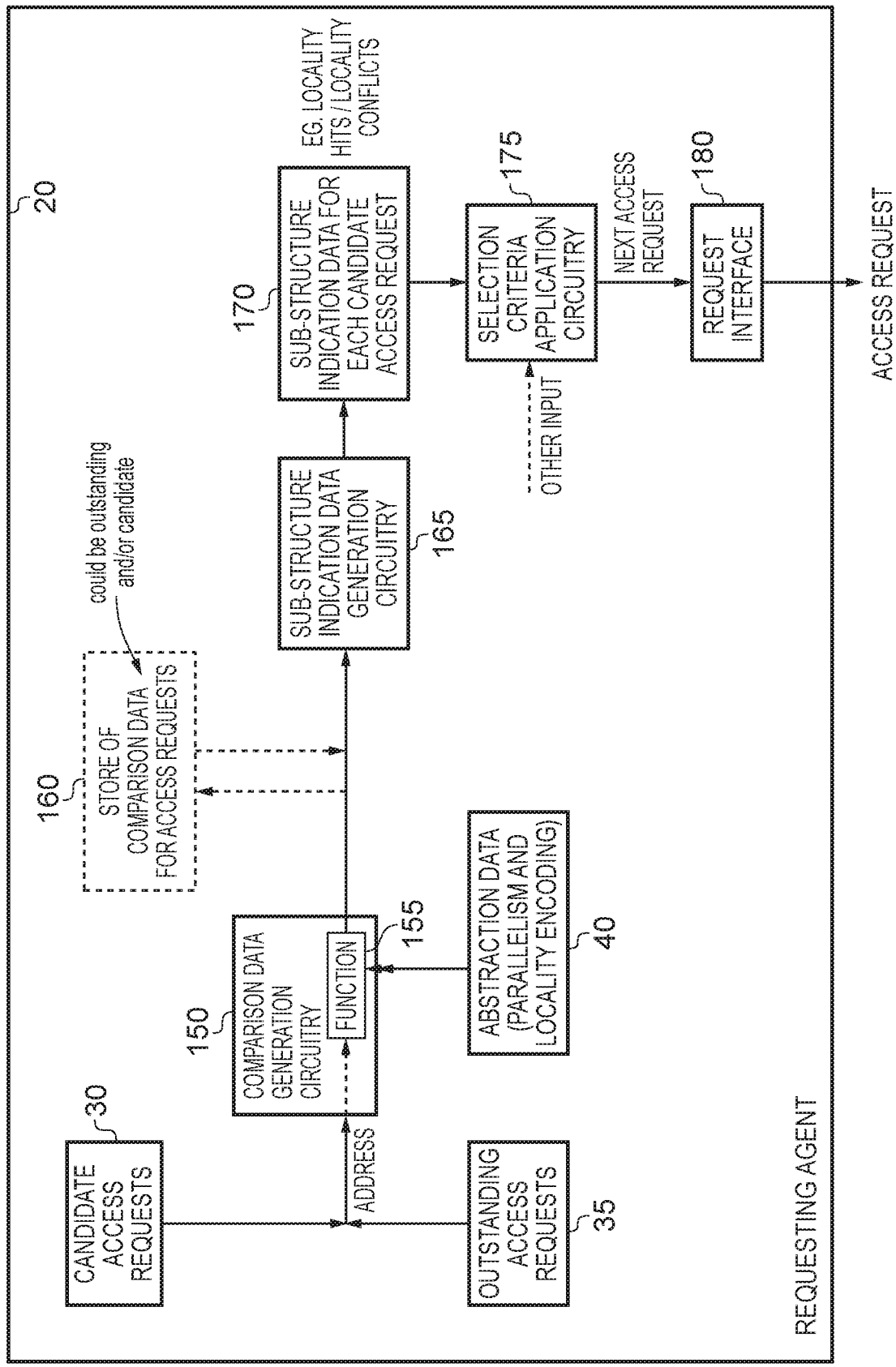
FIG. 3 is a block diagram illustrating in more detail the operation of the requesting agent of FIG. 1 in accordance with one embodiment.

FIG. 3 is a block diagram illustrating in more detail the components provided within the requesting agent 20 in order to seek to output a stream of access requests that will then enable the memory controller 60 to optimise the accesses to memory having regard to the above non-uniform access timing requirements of the memory device.

In particular, comparison data generation circuitry 150 is provided which is arranged to receive as inputs both an address of an access request and the abstraction data held in the storage 40. The comparison data generation circuitry 150 can operate on the memory addresses of either the candidate access requests or the outstanding access requests, and indeed in one embodiment the memory address of each outstanding access request and each candidate access request will be passed through the comparison data generation circuitry 150 at least once. A function 155 is applied to the address using the abstraction data, in order to produce items of comparison data in association with each memory address. In one embodiment, the abstraction data provides an encoding of both parallelism and locality within the memory device, and two pieces of comparison data are produced for each memory address, namely first comparison data that is indicative of a parallel block within the memory device that will require accessing in order to process an access request specifying the input memory address, and second comparison data indicative of a locality block within the memory device that will need to be accessed in order to process an access request specifying the input memory address.

Whilst in one embodiment these various items of comparison data can be generated on the fly as and when needed, in an alternative embodiment a storage 160 is provided for storing at least some of the comparison data items produced by the comparison data generation circuitry 150. For example, such storage may be used to store the comparison data results for both the outstanding access requests and the candidate access requests. As each new candidate access request is received, its memory address can be passed through the comparison data generation circuitry 150 in order to generate the relevant comparison data for adding to the storage 160. Further, as each outstanding access request is completed, and hence is no longer outstanding, the associated comparison data can be removed from the storage 160. In an alternative embodiment, the storage may merely contain the comparison data for all of the outstanding access requests, and the candidate access requests may be re-evaluated each time, with their comparison data items generated on the fly by the circuitry 150.

Sub-structure indication data generation circuitry 165 is then used to produce sub-structure indication data based on an analysis of the comparison data output by the circuitry 150. In particular, for each candidate access request, that candidate access request's comparison data can be compared with the comparison data for all of the outstanding access requests in order to produce the sub-structure indication data. The sub-structure indication data can hence provide locality indication data for each candidate access request with respect to the outstanding access requests. Such locality indication data can take a variety of forms, but in one embodiment, as will be discussed in more detail later with reference to the particular examples of FIGS. 6 to 8, such locality indication data may comprise both locality hits identifying instances where the candidate access request will need to access the same locality block within a particular parallel block that needs to be accessed by one of the outstanding access requests, and locality conflicts identifying when a particular candidate access request will need to access a locality block within a particular parallel block that is different to a locality block that needs to be accessed within the same parallel block by one of the outstanding access requests.

The sub-structure indication data generated by the circuitry 165 is stored within the storage 170, and then provided as an input to the selection criteria application circuitry 175 which is responsible for choosing the next access request to output from the request interface 180 of the requesting agent. In particular, absent any other input that dictates a selection from amongst the candidate access requests, the selection criteria application circuitry 175 can make reference to the sub-structure indication data in the storage 170 in order to decide which candidate access request to select as the next access request. For instance, considering the particular example where the sub-structure indication data takes the form of locality hits and locality conflicts, the selection criteria application circuitry 175 can seek to choose the candidate access request that has the most locality hits. Alternatively, or in addition, it may give consideration to choosing the candidate access request that has the minimum number of locality conflicts.

In some embodiments other input data can also be provided to the selection criteria application circuitry 175 to influence the decisions made. For example, where the requesting agent is a cache, information such as the dirty bit status of cache lines, and optionally other information such as information identifying cache lines that are preferred for eviction, can be used to control the selection criteria. In some embodiments, such other inputs may take precedence over the sub-structure indication data, but where the other input data does not itself result in the selection of a single access request, the sub-structure indication data can then be used to select from the remaining candidates which one should be issued as the next access request.

Figure 4:
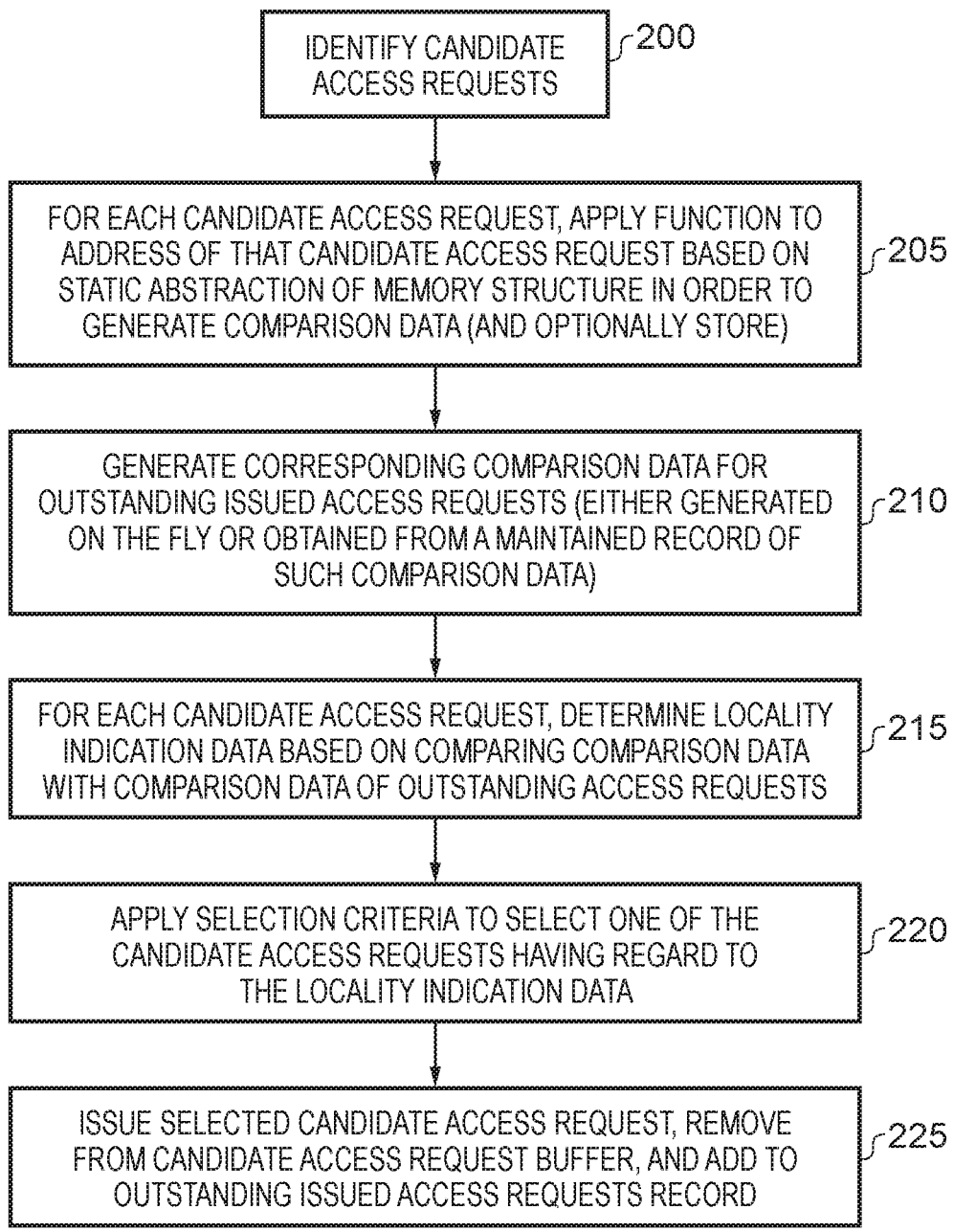
FIG. 4 is a flow diagram illustrating the operation of the requesting agent of FIG. 1 in accordance with one embodiment.

FIG. 4 is a flow diagram illustrating the operation of the requesting agent 20 in accordance with one embodiment. At step 200, the candidate access requests are identified, and then at step 205, for each candidate access request, an abstraction data function is applied by the comparison data generation circuitry 150 using the memory address of the candidate access request and the abstraction data, in order to generate comparison data. As discussed earlier with reference to FIG. 3, this information can be generated on the fly, or may have been precalculated and stored within the storage 160.

Similarly, at step 210, corresponding comparison data is also generated for the outstanding issued access requests, and again this may be generated on the fly or may be obtained from a maintained record of such comparison data such as from the storage 160 shown in FIG. 3.

At step 215, the sub-structure indication data generation circuitry 165 then considers each candidate access request, and determines locality indication data based on comparing the comparison data for that candidate access request with the comparison data of the outstanding access requests. Thereafter, at step 220 the selection criteria application circuitry 175 can apply selection criteria in order to select one of the candidate access requests having regard to the locality indication data. At step 225, the selected candidate access request is then issued as the next access request to the memory controller 60. At this point, the candidate access request is removed from the candidate access requests buffer 30, and an indication of that access request is added to the outstanding issued access requests record 35.

Figure 5A:
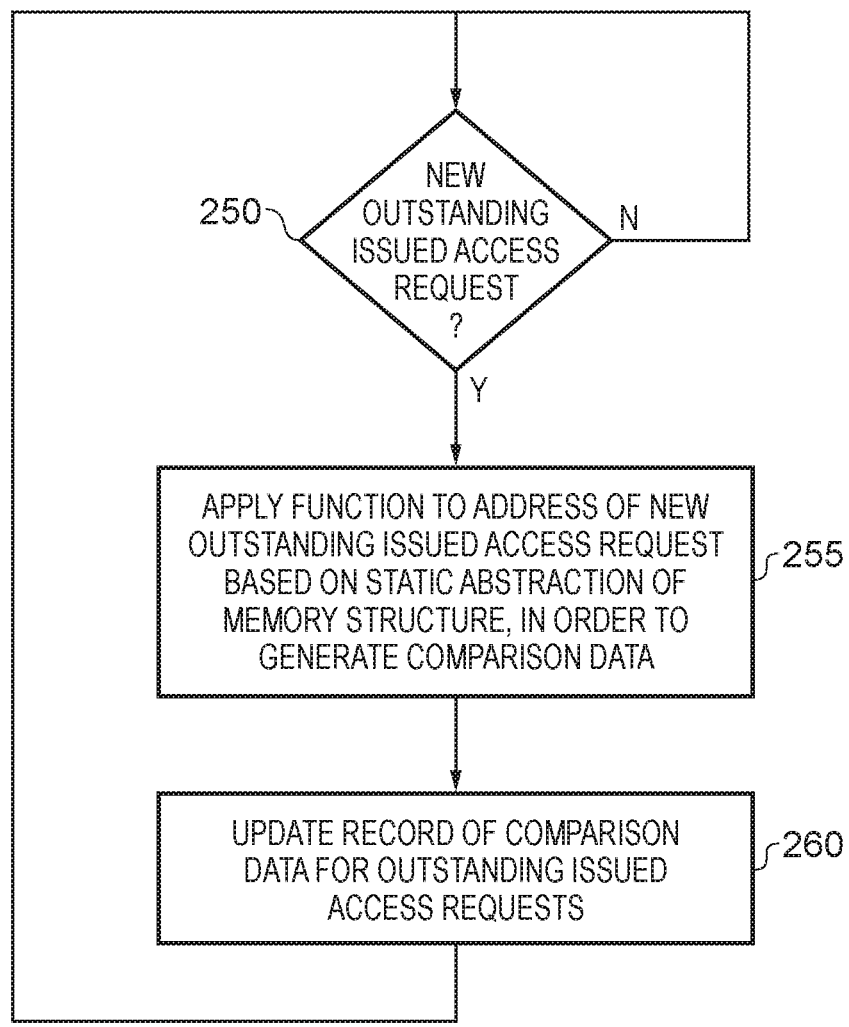
FIGS. 5A and 5B are flow diagrams illustrating how a store of comparison data may be retained for outstanding issued access requests in accordance with one embodiment.
Figure 5B:
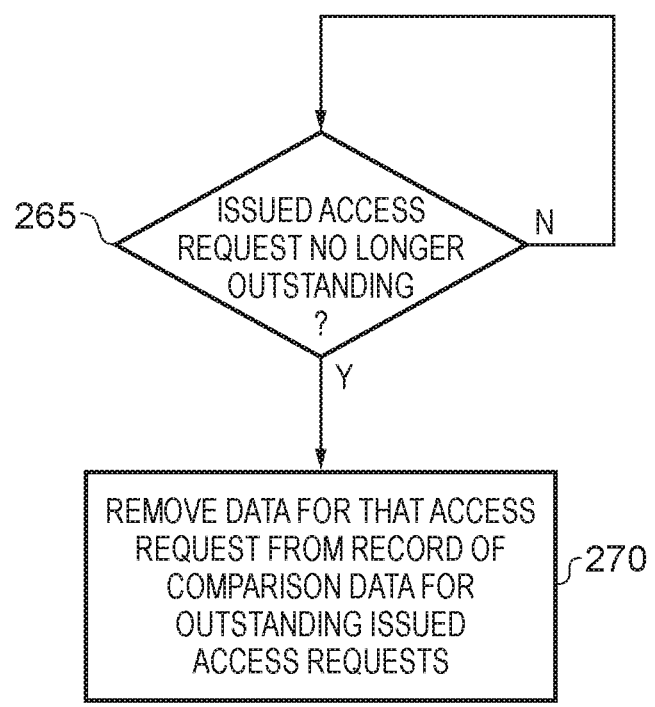

FIGS. 5A and 5B illustrates steps that may be taken in order to maintain the storage 160 in embodiments where the comparison data is precomputed and held within such a storage. FIGS. 5A and 5B identify the process performed for outstanding access requests, but essentially the same process can also be performed for candidate access requests if the comparison data for those candidate access requests is to be precomputed and stored.

At step 250, it is determined whether a new outstanding issued access request has been added to the record 35. If so, then at step 255 the comparison data generation circuitry 150 applies the abstraction data function to the address specified by that new access request in order to generate the comparison data. At step 260, the record of comparison data is then updated in order to incorporate the comparison data for the new access request, whereafter the process returns to step 250.

FIG. 5B illustrates some steps taken when an outstanding access request is no longer deemed outstanding. If such a situation is detected at step 265, then the comparison data for that access request is removed from the record 160 at step 270.

If the record 160 also keeps track of comparison data for candidate access requests, then the process of FIG. 5A is also performed for each new candidate access request. However, in one embodiment, at the time a candidate access request is issued, and hence moves from being a candidate access request to an outstanding access request, no action is required in connection with the information held in the storage, and instead the process of FIG. 5B is only performed when that outstanding access request subsequently is considered no longer to be outstanding.

As mentioned earlier, the static abstraction data can take a variety of forms, but in one embodiment as shown in FIG. 6 takes the form of a locality mask and a parallelism mask. In particular, in this example it is assumed that a memory address consists of 32 bits, where the individual bits specify the features shown by the block 300 in FIG. 6. In particular, in this example it is assumed that the memory device is a two channel memory device having four ranks, eight banks, and 1K columns. It is also assumed that each access request can specify a burst size of up to 32 bytes. As shown by the locality mask 305 in FIG. 6, a locality mask of 0xfff00000 can be used to identify the row bits within a memory address. Further, as shown by the parallelism mask 310, a parallelism mask of 0x000f8040 can be used to identify the channel, rank and bank information within a memory address.

The parallelism mask can hence be used to identify a parallel block (i.e. a unique channel, rank and bank) within the memory device and thus ignores the row bits, the column bits and the bits within the burst. By masking an address with the parallelism mask, a particular bank within the memory device that will need to be accessed can hence be identified. If the comparison data produced for a candidate access request based on application of the parallelism mask to that candidate access request's address is the same as the comparison data generated when the same parallelism mask is applied to the memory address of an outstanding access request, this means that the candidate access request is targeting the same bank as one of the outstanding access requests. By then applying the locality mask to both of those addresses, it can then be determined whether there is a locality hit (in the instance that both the candidate access request and the outstanding access request are targeting the same row) or a locality conflict (in the event that the two accesses are seeking to access different rows within the same bank). Hence, assuming that the term "OT_ADDR" indicates the address of an outstanding access request, and the term "CAND_ADDR" indicates the address of a candidate access request, the locality hit and locality conflict data can be obtained by the following analysis:

LOCALITY HIT IF:
[(OT_ADDR) AND ((LOCALITY MASK) OR (PARALLELISM MASK))]=[(CAND_ADDR) AND ((LOCALITY MASK) OR (PARALLELISM MASK))]
LOCALITY CONFLICT IF:
[(OT_ADDR) AND (PARALLELISM MASK)]=[(CAND_ADDR) AND (PARALLELISM MASK)]
AND
[(OT_ADDR) AND (LOCALITY MASK)]≠[(CAND_ADDR) AND (LOCALITY MASK)]

With reference to the example of FIG. 3, it will be appreciated that the comparison data generation circuitry 150 can perform the functions required to apply the locality masks and parallelism masks to the relevant addresses, thereby producing the required comparison data, and the sub-structure indication data generation circuitry 165 can then perform the functions required to compare the comparison data generated for the outstanding access request with the comparison data generated for the candidate access request.

Figure 7:
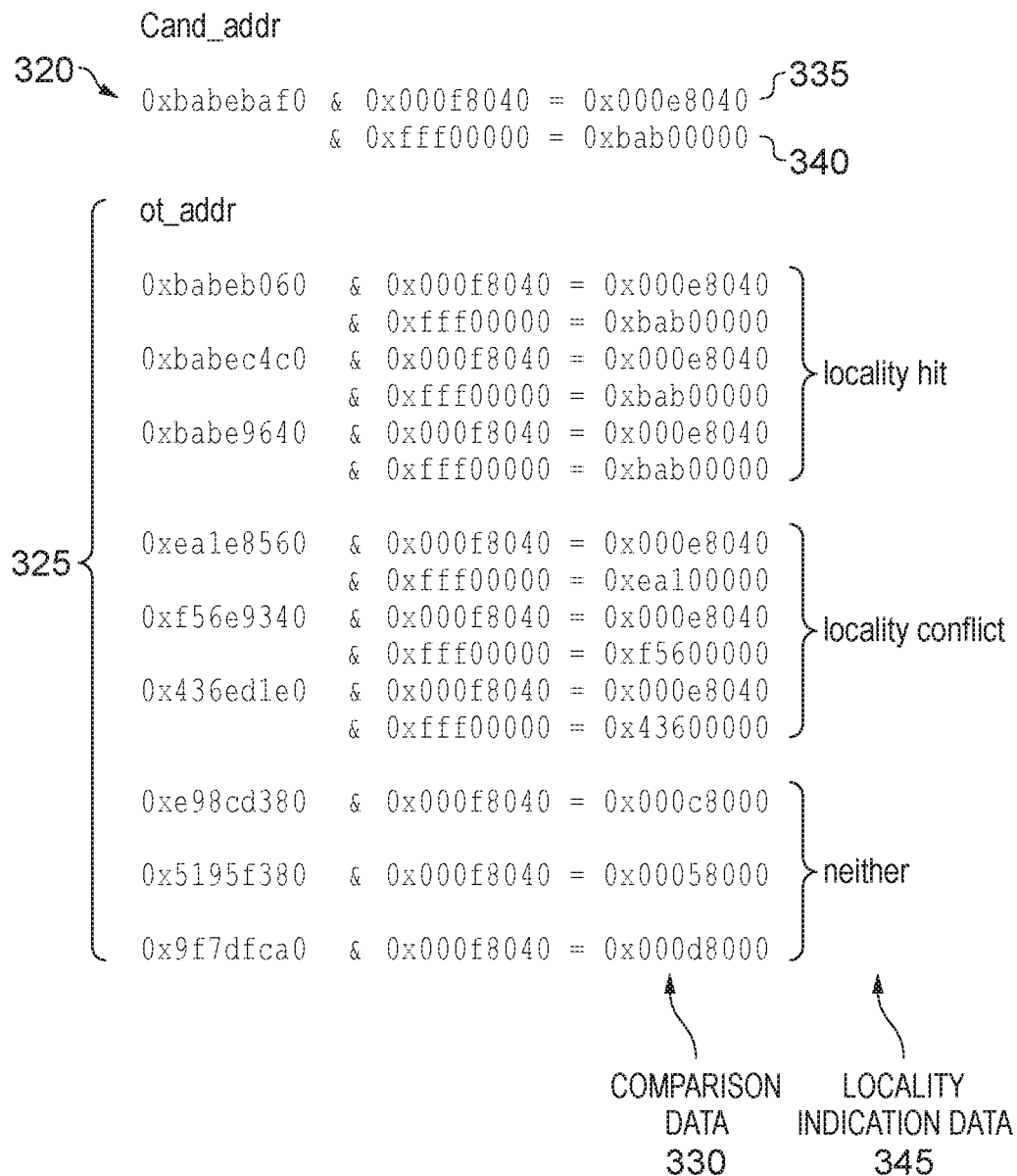
FIG. 7 illustrates the generation of comparison data and locality indication data for an example sequence of addresses, in accordance with one embodiment.

FIG. 7 illustrates the generation of the relevant comparison data and locality indication data for a specific example of one candidate address and nine outstanding addresses. In particular, the comparison data is shown by the column 330. Hence, by way of example, considering the candidate address, the first comparison data formed by application of the parallelism mask is indicated by the reference numeral 335 and the second comparison data generated by application of the locality mask is shown by the reference numeral 340. Corresponding pairs of comparison data can be produced for each of the outstanding access requests based on their addresses. The first three outstanding addresses give locality hits with the candidate address, due to the first comparison data and the second comparison data being the same. The next three outstanding addresses give locality conflicts, since whilst the first comparison data is the same, the second comparison data is different, indicating that those outstanding addresses are seeking to access a different row within the same bank as the candidate address. The final three candidate addresses are neither locality hits nor locality conflicts, since they are in fact directed to different banks to the bank associated with the candidate address. Whilst the second comparison data may be produced for those final three addresses, it does not need to be considered by the locality indication data generation block 165 given that the first comparison data differs.

Figure 8:
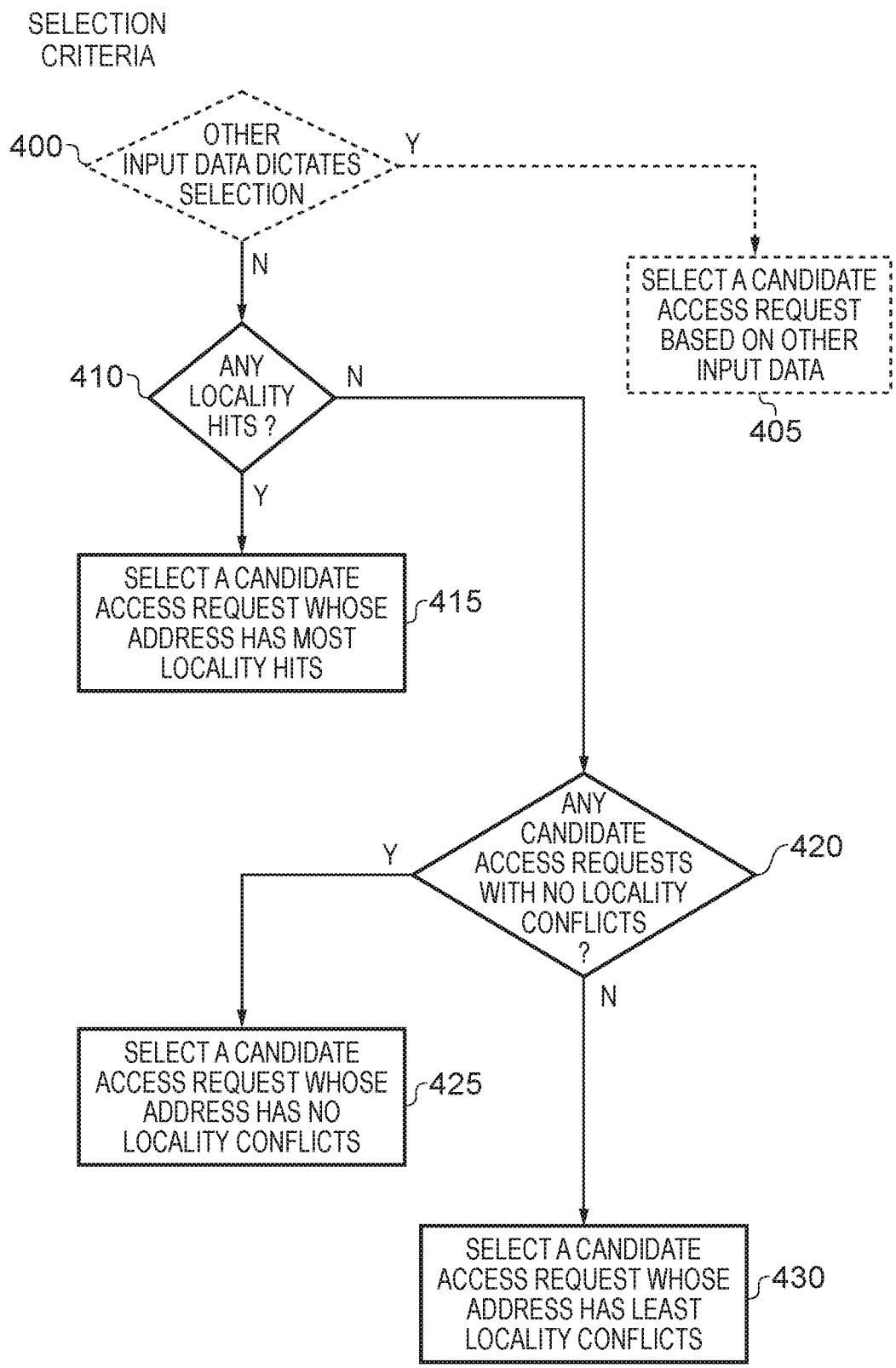
FIG. 8 is a flow diagram illustrating example selection criteria that may be employed by the requesting agent in one embodiment in order to determine a next access request to issue to the memory controller.

FIG. 8 is a flow diagram illustrating how the selection criteria application circuitry 175 within the requesting agent may use the locality hit and locality conflict information in accordance with one embodiment. At step 400, it is determined whether there is any other input data which directly dictates the selection that needs to be made of the next access request. If so, then at step 405 the selection criteria application circuitry 175 selects a candidate access request based on that other input data. For example, considering the situation where the requesting agent is a cache, then if the process is being applied in order to determine a suitable victim cache line, if only one of the candidate victim cache lines is marked as dirty, then the selection criteria application circuitry may choose to select that cache line in preference to other cache lines. As another example, sideband information may identify certain cache lines as being preferred for eviction, with that information overriding any decision based on the locality indication data.

In the absence of such other input data, the process proceeds to step 410. In another variant, such input data may pre-filter some of the candidate access requests, essentially producing a reduced list of candidate access requests that are then considered at step 410.

At step 410, for the (remaining) candidate access requests it is determined whether there are any locality hits. Assuming there is at least one locality hit for one of those candidate access requests, the process proceeds to step 415, where a candidate access request is selected whose address has the most locality hits.

In the absence of a locality hit, the process can proceed to step 420, where it is determined whether there are any candidate access requests with no locality conflicts. If so, then at step 425 a candidate access request is selected whose address has no locality conflicts. If there are multiple candidate access requests with no locality conflicts, then other factors can be taken into account in selecting between those candidate access requests, for example applying a least recently used policy or the like.

If at step 420 it is determined that there are no candidate access requests with no locality conflicts, then the process proceeds to step 430, where a candidate access request is selected whose address has the least locality conflicts.

It will be appreciated that if at step 415 there are multiple candidate access requests that have the same number of most locality hits, or at step 430 there are multiple candidate access requests that have the same number of least locality conflicts, then additional criteria can be applied for choosing between those multiple candidate access requests, such as the above mentioned least recently used approach.

Figure 9:
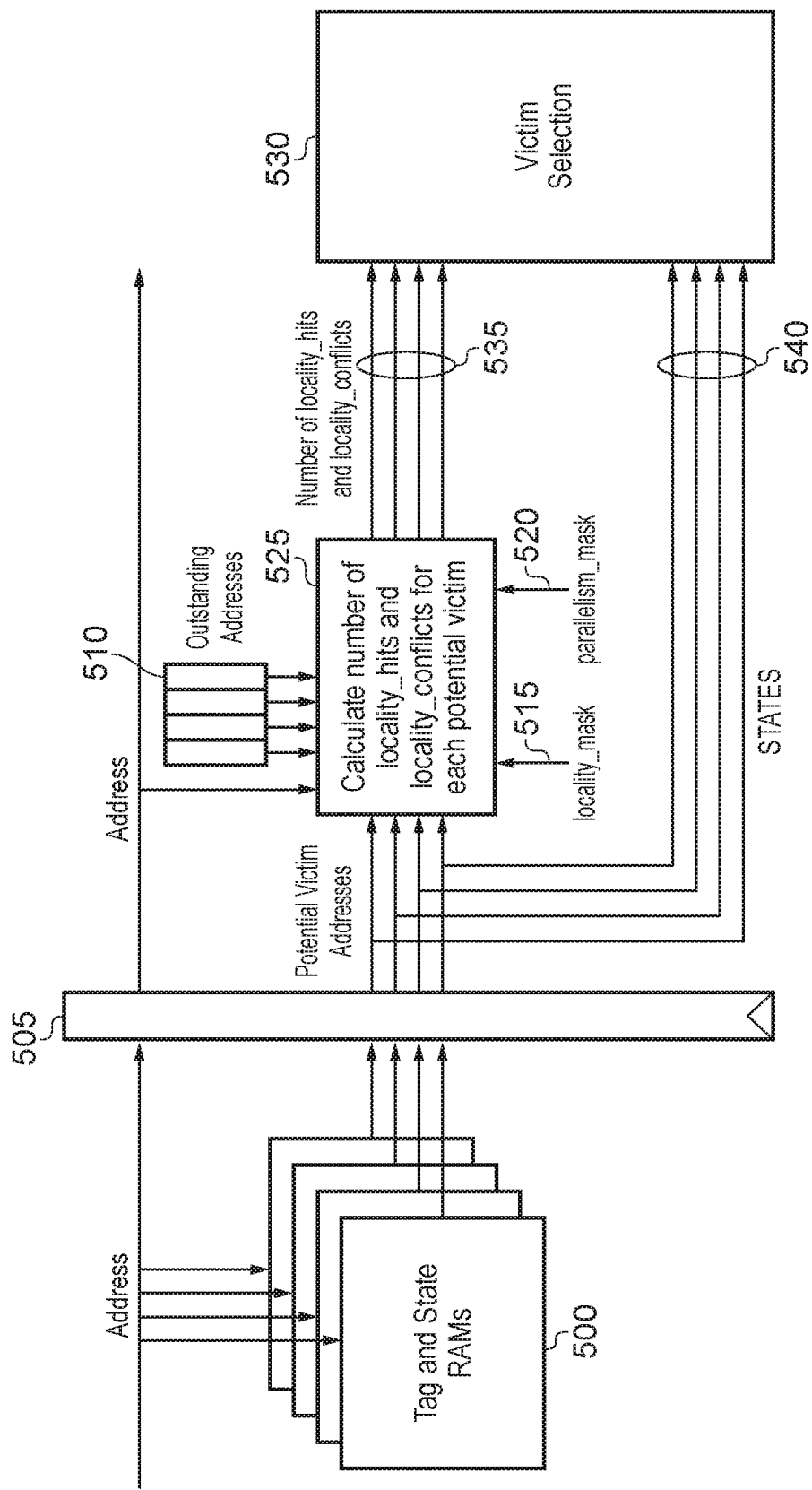
FIG. 9 illustrates how the requesting agent functionality of the described embodiments may be incorporated within a cache in accordance with one embodiment.

As mentioned earlier, the requesting agent can take a variety of forms. Considering the example where the requesting agent is a cache, FIG. 9 illustrates additional circuitry 525 which can be added within the cache to perform the above described locality indication data generation steps. In the example of FIG. 9, it is assumed that the cache needs to select a victim cache line on a cache miss. In particular, it assumed that the cache is a set associative cache, and hence for a specified address, a set can be identified within the tag and state RAMs 500 identifying a single entry within each RAM. The tag and state data from those entries can then be output via the pipeline stage 505 to the circuitry 525. In particular, the tag data within those selected entries represent potential victim addresses (i.e. the addresses associated with data held in cache lines of the cache that can be evicted back to memory in order to make space for the data that will ultimately be retrieved as a result of the cache miss). These potential victim addresses are routed over path 540 to the victim selection circuitry 530. However, in addition, they are passed to the circuitry 525, which also receives the locality mask over path 515, the parallelism mask over path 520, and information about the outstanding access requests that have been issued from the cache. This latter information is held within the buffer 510, which is typically already provided within a cache to keep track of the outstanding access requests. The address that gave rise to the cache miss is also in one embodiment input, since that essentially forms the address of another outstanding access request that will have been issued to the memory device in order to access the required data to service the cache miss.

The circuitry 525 can then essentially perform the operations described in relation to the components 150, 165 in FIG. 3 in order to produce comparison data and then derive locality indication data from that comparison data. The number of locality hits and locality conflicts for each potential victim address can then be provided over path 535 to the victim selection circuitry 530. The victim selection circuitry 530 can then perform the functions described with reference to the selection criteria application circuitry 175 of FIG. 3 in order to determine which cache line to evict, and hence which victim address to output as an access request to the memory device.

In the example of FIG. 9, it is assumed that the calculation of the hit/miss happens in parallel (and is not shown in the figure), and the result is used later in order to determine whether or not to actually victimise the chosen victim cache line identified by the victim selection circuitry 530.

Whilst in FIG. 9 it is assumed that the selection is being made in respect of victim cache lines on a cache miss, it is also possible in some embodiments for hit lines (e.g. if dirty) to form candidate access requests, so as to enable early write back operations to be performed, for example if the dirty cache line appears to have a number of locality hits with regard to outstanding access requests.

The same basic mechanism can also be applied to the earlier example of abstracted memory such as the HMC memory system, where the on-chip controller (requesting agent) would have buffers/queues storing an indication of outstanding read and write access requests that it has issued but have not yet been serviced. In choosing what candidate access request to send next, the on-chip controller could then apply the above described techniques in order to seek to select a candidate access request that has the highest number of locality hits, or in the absence of locality hits to aim to select an access request that has no locality conflicts. In the absence of no locality conflicts, it could then select a candidate access request with the least number of locality conflicts.

From the above description of embodiments, it will be seen that such embodiments provide a technique for distributing static information about a physical memory architecture, capturing the locality and parallelism, such that that information can then be used by requesting agents in the system to seek to issue more memory-friendly access sequences to the memory controller, and thus improve the memory performance. In one embodiment, whilst the information about the memory is static and abstracted at the requesting agent, the requesting agent is still able to send a more optimal access stream to the memory controller by prioritising locality hits, and seeking to avoid locality conflicts. The static abstraction data can take a variety of forms, but in one embodiment can be distributed in the form of static address decoding functions, without needing any dynamic information from the memory controller and without needing any detailed knowledge of the memory organisation.

Whilst in the specific example discussed with reference to FIGS. 6 and 7, the static abstraction data takes the form of a parallelism mask and a locality mask, it will be appreciated that for cases with more complex memory address mappings, for example using hashing functions, the encoding of the static abstraction data could be expressed in terms of functions rather than simple bit masks.

Further, whilst in the specific example discussed it is assumed that the memory device is DRAM memory, it will be appreciated that the techniques are not limited to DRAM memory, and instead can be applied to any form of memory device having such parallelism and locality structures, for example Correlated Electron Random Access Memory (CeRAM), Ferroelectric RAM (FeRAM), etc.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A requesting agent device, comprising:
a request interface to issue access requests from the requesting agent device to a memory controller for a memory device whose memory structure consists of a plurality of sub-structures, each access request identifying a memory address;
an abstraction data storage to store static abstraction data providing an indication of one or more of the sub-structures;
an outstanding access requests storage to store an indication of outstanding access requests issued from the request interface; and
next access request selection circuitry to select from a plurality of candidate access requests a next access request for issuance from the request interface to the memory controller, said selection being dependent on sub-structure indication data derived from application of an abstraction data function, using said static abstraction data, to the memory addresses of the candidate access requests and the outstanding access requests, wherein the requesting agent device comprises on-chip memory interface circuitry of an integrated circuit, and the memory controller is off-chip.

2. A requesting agent device as claimed in claim 1, further comprising:
comparison data generation circuitry to produce comparison data for a memory address by applying said abstraction data function to said memory address; and
sub-structure indication data generation circuitry to generate said sub-structure indication data for each candidate access request by comparing the comparison data produced for the memory address of that candidate access request with the comparison data produced for the memory address of at least a subset of said outstanding access requests.

3. A requesting agent device as claimed in claim 2, wherein said at least a subset of said outstanding access requests comprises all outstanding access requests indicated in said outstanding access requests storage.

4. A requesting agent device as claimed in claim 1, wherein said plurality of sub-structures comprise a plurality of parallel sub-structures that are accessible in parallel, each parallel sub-structure comprising a plurality of locality sub-structures, for each parallel sub-structure only one locality sub-structure being accessible at a time.

5. A requesting agent device as claimed in claim 4, wherein the static abstraction data provides an encoding of said parallel sub-structures and said locality sub-structures.

6. A requesting agent device as claimed in claim 5, wherein:
the static abstraction data comprises a parallelism mask and a locality mask; and
for a chosen memory address, the application of said abstraction data function comprises applying the parallelism mask to said chosen memory address to produce first comparison data indicative of a parallel sub-structure associated with the chosen memory address, and applying the locality mask to said chosen memory address to produce second comparison data indicative of a locality sub-structure associated with the chosen memory address.

7. A requesting agent device as claimed in claim 1, wherein said sub-structure indication data provides locality indication data for each candidate access request with respect to the outstanding access requests.

8. A requesting agent device as claimed in claim 7 wherein:
the static abstraction data comprises a parallelism mask and a locality mask; and
for a chosen memory address, the application of said abstraction data function comprises applying the parallelism mask to said chosen memory address to produce first comparison data indicative of a parallel sub-structure associated with the chosen memory address, and applying the locality mask to said chosen memory address to produce second comparison data indicative of a locality sub-structure associated with the chosen memory address;
wherein said locality indication data provides a locality hit indication for a candidate access request if the first and second comparison data produced for the memory address of the candidate access request matches the first and second comparison data produced for the memory address of an outstanding access request.

9. A requesting agent device as claimed in claim 7, wherein:

the static abstraction data comprises a parallelism mask and a locality mask; and
for a chosen memory address, the application of said abstraction data function comprises applying the parallelism mask to said chosen memory address to produce first comparison data indicative of a parallel sub-structure associated with the chosen memory address, and applying the locality mask to said chosen memory address to produce second comparison data indicative of a locality sub-structure associated with the chosen memory address;
wherein said locality indication data provides a locality conflict indication for a candidate access request if the first comparison data produced for the memory address of the candidate access request matches the first comparison data produced for the memory address of an outstanding access request, but the second comparison data produced for the memory address of the candidate access request does not match the second comparison data produced for the memory address of that outstanding access request.

10. A requesting agent device as claimed in claim 9, wherein said locality indication data provides a locality hit indication for a candidate access request if the first and second comparison data produced for the memory address of the candidate access request matches the first and second comparison data produced for the memory address of an outstanding access request, and wherein the next access request selection circuitry is arranged to select the next access request for issuance from the request interface with reference to the locality hit indications and locality conflict indications produced for each of the plurality of candidate access requests.

11. A requesting agent device as claimed in claim 10, wherein the next access request selection circuitry is arranged to select access requests for issuance from the request interface so as to give preference to access requests having locality hit indications.

12. A requesting agent device as claimed in claim 10, wherein the next access request selection circuitry is arranged to select access requests for issuance from the request interface so as to give preference to access requests that do not have locality conflict indications.

13. A requesting agent device as claimed in claim 1, wherein the static abstraction data is generated at initialisation time of the memory controller.

14. A requesting agent device as claimed in claim 13, wherein the static abstraction data is not altered during run-time of the memory controller.

15. A requesting agent device as claimed in claim 1, wherein the outstanding access requests storage is responsive to acknowledgement data from the memory controller to remove from the indication of outstanding access requests any access request that is no longer outstanding.

16. A requesting agent device as claimed in claim 15, wherein for at least one type of access request the outstanding access requests storage is arranged to apply predetermined criteria to determine when an outstanding access request is no longer to be considered outstanding, and to remove from the indication of outstanding access requests any access request that is no longer considered outstanding.

17. A requesting agent device as claimed in claim 1, wherein the request interface is coupled to the memory controller via an interconnect structure employing an interconnect protocol.

18. A requesting agent device as claimed in claim 1, wherein the requesting agent device is a cache provided within a data processing system.

19. A method of issuing access requests from a requesting agent device to a memory controller for a memory device whose memory structure consists of a plurality of sub-structures, each access request identifying a memory address, the method comprising:
- storing, within the requesting agent device, static abstraction data providing an indication of one or more of the sub-structures;
- storing, within the requesting agent device, an indication of outstanding access requests issued from a request interface of the requesting agent device; and
- selecting from a plurality of candidate access requests a next access request for issuance from the request interface to the memory controller, said selection being dependent on sub-structure indication data derived from application of an abstraction data function, using said static abstraction data, to the memory addresses of the candidate access requests and the outstanding access requests,
- wherein the requesting agent device comprises on-chip memory interface circuitry of an integrated circuit, and the memory controller is off-chip.

* * * * *